United States Patent
Sonnenrein et al.

(10) Patent No.: US 7,493,198 B2
(45) Date of Patent: Feb. 17, 2009

(54) METHOD AND DEVICE FOR A VEHICLE-RELATED TELEMATICS SERVICE

(75) Inventors: Thomas Sonnenrein, Bockenem (DE); Norbert Bauer, Bad Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/516,569

(22) PCT Filed: May 19, 2003

(86) PCT No.: PCT/DE03/01604

§ 371 (c)(1),
(2), (4) Date: Sep. 26, 2005

(87) PCT Pub. No.: WO03/105093

PCT Pub. Date: Dec. 18, 2003

(65) Prior Publication Data

US 2006/0095174 A1    May 4, 2006

(30) Foreign Application Priority Data

Jun. 10, 2002 (DE) ................. 102 25 788
Dec. 6, 2002 (DE) ................. 102 57 030

(51) Int. Cl.
*G06F 17/00* (2006.01)

(52) U.S. Cl. ................. 701/33; 701/29; 340/438; 340/445

(58) Field of Classification Search ........... 701/33, 701/35, 29; 340/438, 425.5, 445; 348/211.3; *G06F 17/00*
See application file for complete search history.

(56) References Cited

U.S. PATENT DOCUMENTS

| | | | |
|---|---|---|---|
| 6,181,994 B1 | 1/2001 | Colson et al. | |
| 6,421,593 B1* | 7/2002 | Kempen et al. | 701/48 |
| 6,434,458 B1* | 8/2002 | Laguer-Diaz et al. | 701/35 |
| 6,574,537 B2* | 6/2003 | Kipersztok et al. | 701/29 |
| 6,647,323 B1* | 11/2003 | Robinson et al. | 701/1 |
| 2002/0007237 A1* | 1/2002 | Phung et al. | 701/33 |
| 2002/0044049 A1* | 4/2002 | Saito et al. | 340/438 |
| 2002/0049535 A1* | 4/2002 | Rigo et al. | 701/211 |
| 2003/0114965 A1* | 6/2003 | Fiechter et al. | 701/29 |
| 2003/0114966 A1* | 6/2003 | Ferguson et al. | 701/29 |
| 2003/0208309 A1* | 11/2003 | Triphathi | 701/29 |

FOREIGN PATENT DOCUMENTS

| | | |
|---|---|---|
| DE | 100 26 754 | 12/2001 |
| EP | 0 718 614 | 6/1996 |
| JP | 10133905 | 5/1998 |
| JP | 11161510 | 6/1999 |
| JP | 2000289583 | 10/2000 |
| WO | 01/76170 | 10/2001 |
| WO | 03/063448 | 7/2003 |

* cited by examiner

*Primary Examiner*—Tuan C To
(74) *Attorney, Agent, or Firm*—Kenyon & Kenyon LLP

(57) ABSTRACT

A method and a device for a vehicle-related telematics service are provided in which the telematics service is divided into partial functionalities and these partial functionalities are subdivided between server and data terminal.

10 Claims, 3 Drawing Sheets

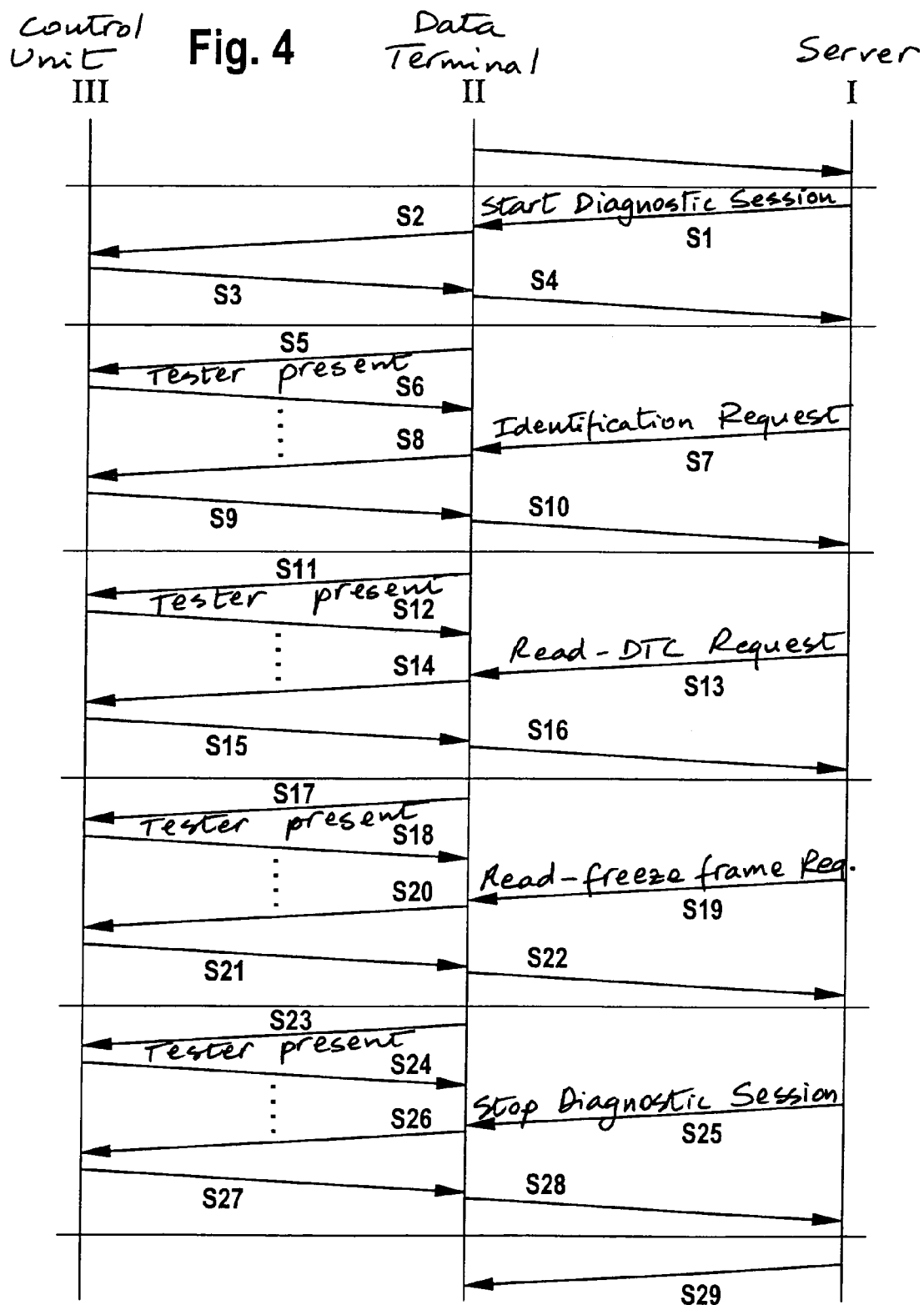

METHOD AND DEVICE FOR A VEHICLE-RELATED TELEMATICS SERVICE

FIELD OF THE INVENTION

The present invention relates to a method and a device for a vehicle-related telematics service acting on at least one functionality in a motor vehicle via an air interface, for example a mobile radio network, in particular in connection with remote diagnosis of motor vehicles.

BACKGROUND INFORMATION

The proliferation of networked control units in today's motor vehicles offers more and more opportunities for influencing functionalities in the vehicle, for example better diagnosis options in case of faults, or remote operation of functions and/or components of the vehicle. Concepts permitting reliable and safe access to the functionality in the vehicle across various distances via radio-communication-based action are available in this context so as to carry out reliable and high-quality fault diagnoses via remote diagnosis by a service center or a remote diagnosis server equipped with a corresponding diagnostic database, for example. These approaches utilize communication systems integrated in the vehicle such as mobile phones and/or GSM-supported telematics-data terminals to transmit data between the control units connected to a vehicle network and/or components and the server of the service center. A proposal for such a system is described in published German Patent document DE 100 26 754. A specific realization with respect to the transmission content between server and data terminal and with respect to the design of the terminal or server is not mentioned.

SUMMARY OF THE INVENTION

Splitting the functions such as diagnosis functions between the vehicle data terminal and the server (partitioning of partial functions) results in considerable resource savings in the data terminal. Vehicle-specific functions that are not critical with respect to time and which control the action on the selected functionality need not be stored in the vehicle-data terminal, but may be stored in the server and transmitted from there via an air interface. As a result, the air interface requires no additional application protocol specifically tailored to the application, in particular with respect to temporal boundary conditions specified by the vehicle network, so that conventional standard protocols may be utilized for the air interface. Furthermore, the transmission of vehicle-specific data via the air interface allows a uniform, parameterizable functionality in the data terminal as well as a vehicle-independent implementation of the same. This results in excellent flexibility of the system, which is also adaptable to changes in the vehicle equipment.

In the context of remote diagnosis, modifications or improvements in the server with respect to the diagnosis itself are possible provided the latter is not running onboard in the control units of the vehicle. This refers primarily to the execution and scope (transmitted data) of the remote diagnosis procedure.

In connection with remote diagnosis, the commands of the vehicle-specific diagnosis protocol may be transmitted from the server to the data terminal via the air interface.

Due to the resource savings in the vehicle data terminal, in particular due to the fact that processes that are not critical with respect to time are stored in the server of the service center, simple and rapid implementation onto the vehicle network in the data terminal is possible.

The overall result is an efficient procedure for acting on a vehicle functionality in motor vehicles, primarily for the purpose of remote diagnosis, remote service, remote control, software download, etc., such procedures being implementable at low cost, in particular.

BRIEF DESCRIPTION OF THE DRAWINGS

FIG. 4 shows the communication between server and data terminal and between data terminal and control unit to be diagnosed as well as the detailed procedures executed in the respective units, on the basis of an exemplary embodiment.

DETAILED DESCRIPTION

Figure 1:
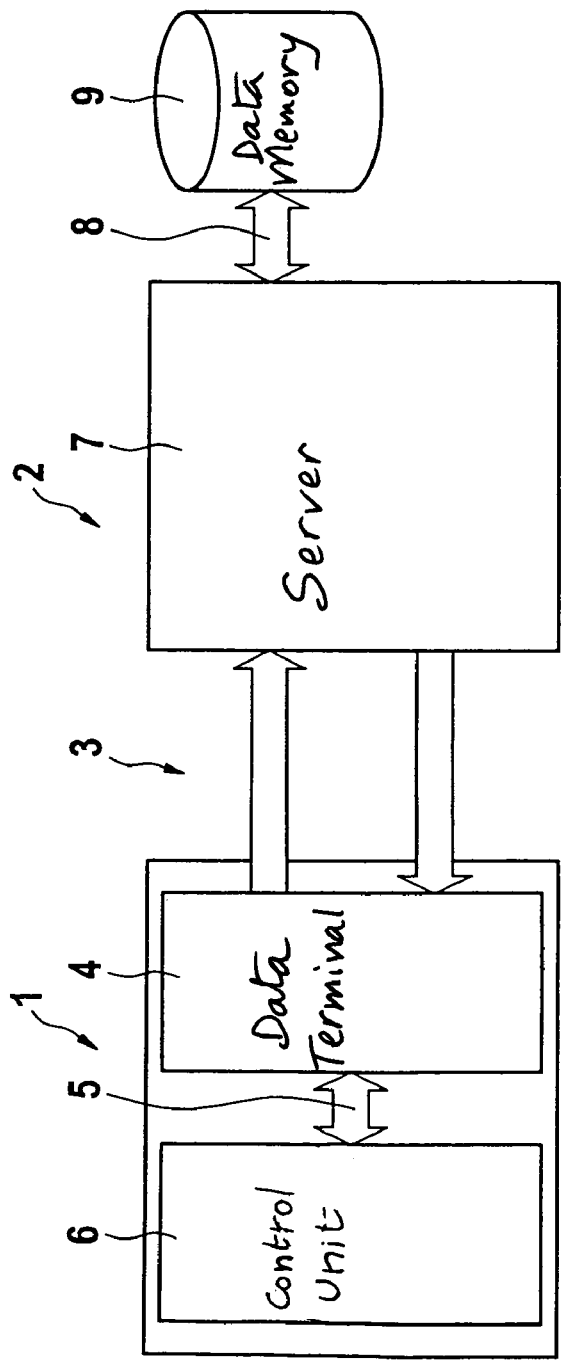
FIG. 1 shows a schematic diagram of a remote-diagnosis system.

FIG. 1 shows an overall representation of a system for a vehicle-related telematics service in which information is exchanged between a vehicle (the vehicle data terminal) and a server using a mobile radio network or using a data network such as the Internet. Such a configuration is utilized in connection with functions for remote action, remote diagnosis, remote service, software download etc. Remote action or remote querying is basically understood as the remote control of vehicle functions, in particular comfort functions such as turning on the parking heater etc. and querying vehicle statuses and/or operating parameters. In the process, the user initiates a communication with the vehicle via a central server, or the user communicates directly with the vehicle. Remote diagnosis includes the remote reading out of diagnostic data from the vehicle, their analysis and possibly the generation of a recommendation regarding further steps. Analysis of the data and generation of the recommendation are performed by a central server, which is connected to the vehicle via a mobile radio network, a wire-bound network and/or a data network such as the Internet. An additional function which should be mentioned in this context is the so-called software download or remote flashing by which a new program code or new parameters may be implemented in systems in the vehicle that are able to be configured by software, for example control units, so as to increase their functionalities or their performance. Here, too, the communication is carried out via a mobile radio network, a wire-bound network and/or the Internet, for instance, relying on a central computer (server) or service center. Remote service is essentially the monitoring of the vehicle state and access to service data in the vehicle originating from a central location, thereby checking whether, when and which measures have been implemented to maintain the setpoint state. One such example is the dynamic adaptation of service intervals. These functionalities as a whole are subsumed here under the term of vehicle-related telematics services.

FIG. 1 shows an onboard component 1 and a server-side component 2. Both components are interconnected via a communication interface 3, in particular an air interface, using a mobile radio network, for instance. The onboard component is made up of a data terminal 4, such as a telematics data terminal, which is connected to vehicle electronic system 6 (control unit) via an additional interface 5 (vehicle network). Server-side component 2 comprises a server 7, which is operated by a service center, the vehicle manufacturer or a supplier, for instance, and which is connected via an interface 8 to a data memory 9 in which vehicle-related data and/or commands and/or programs are stored within the framework of a database. According to the following detailed description, the partial functions in the illustrated client-server system are partitioned, that is to say, server and client are assigned certain functionalities of a telematics service. It is assumed that the control units in the vehicle to be diagnosed or controlled are fully interconnected to the data terminal via a CAN bus, for example, and that interface 3, in particular a mobile radio interface, is available in the vehicle. The various methods known for diagnostic-data acquisition, for instance via a CAN-bus interface, may be divided into applications that are not critical with respect to time and applications that are critical with respect to time. Examples of applications that are not critical with respect to time are the sequence control of the diagnostic tester, including access to a database, and the diagnosis protocol itself such as the KWP2000 protocol or variants thereof. Time-critical applications are the transport protocol of the vehicle network (such as the CAN transport protocol) or variants thereof, its communication layer (CAN communication layer, for example) as well as the bus itself (the CAN bus, for instance). When implementing the telematics function in the motor vehicle it is essential that the time-critical processes be decoupled from the less reliable mobile radio channel. Therefore, all or parts of the relevant functions not subject to stringent time demands are swapped out of the vehicle, in particular demands regarding a minimum or maximum time duration between command and response in a data transmission. In the extreme case only the time-critical data transport will therefore remain on the vehicle bus (for instance the CAN bus or the like) on the client or vehicle side, the vehicle bus being realized by functions of the transport protocol such as fragmentation or defragmentation of complex messages. The function scope of the generally more complex and vehicle-specific service protocol (such as the diagnosis protocol) is swapped out to a corresponding server (the diagnosis server, for example). If remote diagnosis is involved, not only vehicle-specific diagnostic commands on the basis of the particular utilized diagnosis protocol but also additional information are transmitted between the server application (sequence control of the overall process) and the client application (sequence control of the data acquisition). These sequence controls are used to activate the diagnosis procedure, to configure the client application and to subsequently transmit results of the server-side data analysis. In the sketched example where all processes that are not critical with respect to time have been swapped out of the onboard component to the server-side component of the system, the system architecture shown in FIG. 2 results. In other exemplary embodiments, only some of the processes that are not critical with respect to time are swapped out, while others remain in the onboard data terminal. For example, it is conceivable that vehicle-specific data and/or special vehicle-specific diagnostic commands, which are not swapped out for reasons of security, remain in the onboard component of the system.

In connection with other telematics services, such as remote control of components, software download etc., those applications that are not critical with respect to time are stored remotely whereas time-critical applications remain in the vehicle data terminal.

Figure 2:
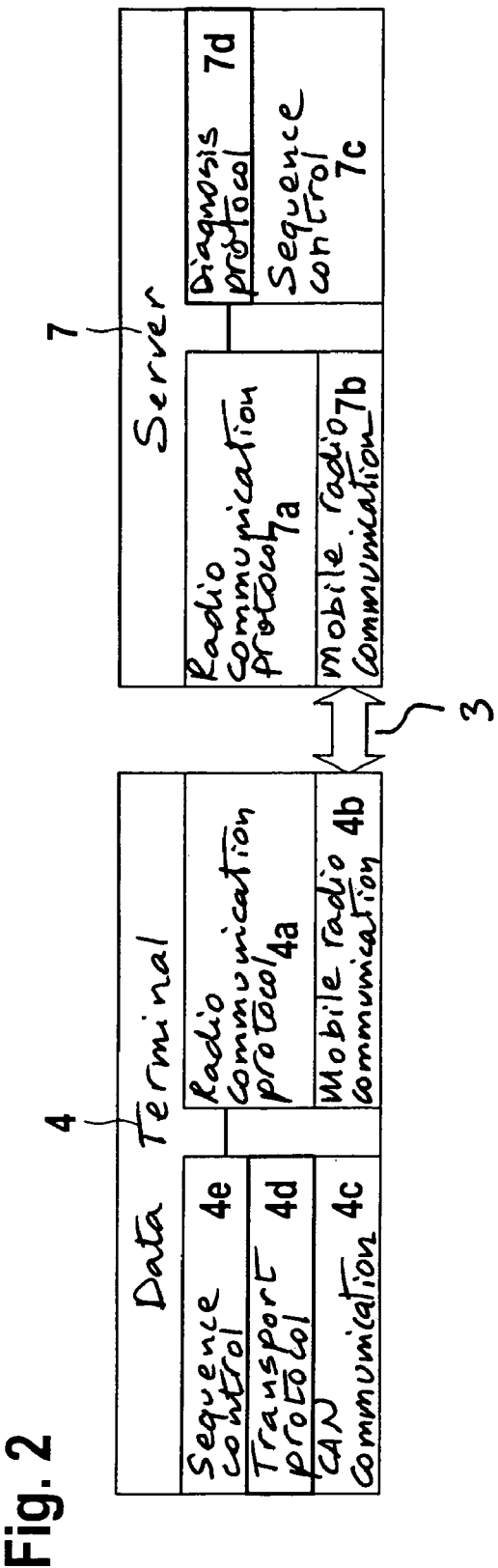
FIG. 2 shows the division of the diagnosis functionality between onboard and server-side components of the system in an overall representation, exemplary embodiments of the vehicle data terminal and of the server of the service center, in particular, also resulting from the representation.

FIG. 2 shows vehicle data terminal (client) 4 as well as server 7, which are interconnected via air interface 3. In the exemplary embodiment, air interface 3 is a conventional mobile radio network based on the GSM standard, for example. In other applications, mobile radio networks working with other standards are involved. The server includes the following modules: a mobile radio communication protocol module 7a, a mobile radio communication module 7b, a sequence-control module 7c as well as a vehicle-specific diagnosis protocol module 7d. The vehicle data terminal also includes a communication-protocol module 4a, a module 4b for communication via the mobile radio interface, a module 4c for CAN communication and a transport protocol module 4d. Furthermore, sequence control 4e is provided in the vehicle data terminal. The modules may comprise software programs.

These functional units have the following tasks:

Mobile radio communication modules 4b, 7b, which are provided both in the data terminal and in the server, ensure stable data transmission, establish and terminate connections, provide data security, possibly encryption, packet assembly etc. These tasks are realized by conventional communication functional units and are available within the framework of GSM standards, for instance.

CAN communication module 4c provided in the vehicle data terminal constitutes a hardware-independent software interface for the data transmission to connected control units using a CAN bus. Among these are the initialization and control of the CAN controller, the transmission and receiving of CAN components, as well as overrun error treatments and wake-up functions. The module also includes the functions of OSI layer 1 and 2 (physical layer, data link layer). The software module operates within the framework of the applicable CAN specification. Instead of the CAN bus, other exemplary embodiments utilize a different bus system (standardized or customer-specific), the software module then being realized on the basis of a corresponding specification.

Sequence control 7c in the server breaks down the diagnostic basic functions into individual partial processes or diagnostic services, assumes the initialization of the process, controls and terminates the diagnostic procedure, processes the necessary parameter and protocol mechanisms for the diagnostic procedure, if applicable, and controls the overall process with respect to time. Furthermore, the ascertained diagnostic data are evaluated here, a recommendation possibly being generated. Furthermore, the sequence control implements the accessing of the server's diagnostic database. The sequence control constitutes a software module, which is configured for the special application. In the following, an example is sketched in FIGS. 3 and 4 on the basis of remote diagnosis.

In a corresponding manner, a sequence-control module 4e is provided in the vehicle data terminal. This software module, too, is configured for the special application. In the following, an example is sketched in FIGS. 3 and 4 on the basis of remote diagnosis. This sequence control generates a server inquiry for implementation of a remote diagnosis. It configures the functions in the vehicle, for example by specification of a tester-present message, adjustment of the timing parameters for the transport protocol and adjustment of the parameters for the CAN communication, if appropriate. Furthermore, the sequence control carries out the diagnosis communication with the control units to be diagnosed via cyclical generation of tester-present messages. In addition, it implements the diagnostic commands transmitted by the server to the CAN-transport protocol. The sequence control also transmits the data to the server, to this end implementing the diagnostic data ascertained in the vehicle onto the mobile radio interface. Furthermore, measures are taken by which, in one exemplary embodiment, the evaluated results of the fault analysis transmitted by the server are displayed. Moreover, the sequence control is responsible for terminating the diagnostic communication by stopping the generation of tester-present messages. In addition, in one exemplary embodiment the automatic termination of an interrupted diagnosis procedure, by timeout or watchdog, for instance, is executed for the reception of server commands.

Transport protocol module 4*d* provided in data terminal 4 carries out the transmission of complex messages or data units via a CAN bus, decouples the diagnosis protocol from the physical transmission medium and provides the services of OSI layer 3 (network layer) as well as the connection between OSI layer 2 (data link layer) and 7 (application layer). That is to say, the transport protocol module performs a segmentation and acquisition of data from the data link layer, i.e., the control of the data flow of individual messages, including administration and assignment of physical CAN messages to logical messages or data units, as well as error detection. The widely used ISO transport protocol (ISO 15765-2) constitutes one realization, but other applications may also use special variants of this protocol. The same applies if other bus systems are used to communicate with the vehicle control units.

Diagnosis protocol module 7*d* assigned to the server includes the diagnosis layer, which in an exemplary embodiment includes the ISO-specified diagnosis protocol KWP2000. Depending on the exemplary embodiment, variants thereof may be used as well. This diagnosis protocol module defines special diagnostic services which are utilized in various ways depending on the vehicle manufacturer and/or vehicle type, and which may include different supplementary services. The diagnosis protocol module analyzes the diagnosis inquiries. Additional functions assumed by the module are the conversion of services into a functional interface for the application layer, the direct utilization of special services and exception handling when using unknown services. An example for such a module realization may be gathered from the procedures described in the following.

The basic procedure within the framework of remote diagnosis is that, following activation of the remote diagnosis by an operator such as the user of the motor vehicle and/or the service provider and/or the vehicle manufacturer and/or a service technician in a service station, and following conclusion of the measures for establishing a connection between the data terminal and server, the commands of the vehicle-specific diagnosis protocol are transmitted from the server to the data terminal via the air interface. After identifying the vehicle to be diagnosed, the diagnosis server reads out the vehicle-specific diagnosis-protocol commands from a database. The data terminal implements the transmitted diagnostic commands onto the vehicle network. This is accomplished, for example, in that the received commands are implemented into commands for the diagnosing control unit and transmitted to the control unit via the interface with the vehicle network, in particular via a CAN bus. The answer from this control unit is received as data message from the vehicle network in the appropriate format via the vehicle-network interface, and the user terminal then implements it into reply messages for the server. These are then transmitted to the mobile radio interface, which sends the message to the server via a provided transmission protocol (within the framework of the GSM standard, for instance). To sum up, the client in the exemplary embodiment thus implements the diagnosis protocol (KWP2000) transmitted by the server onto the CAN transport protocol and vice versa. The sequence control of the described procedure for maintaining the diagnosis communication in the vehicle is carried out in the data terminal in an autonomous manner, for example using so-called tester-present messages. These are defined in the KWP2000 specification and used to comply with the timing requirements of the vehicle network. In this way, the time-critical diagnosis communication in the vehicle is decoupled from the diagnosis sequences in the server that are not critical with respect to time. The result is a flexible configuration of the vehicle-specific diagnosis communication in the vehicle, which is not encumbered by possible problems of the air interface and the diagnostic sequences in the server.

Figure 3:
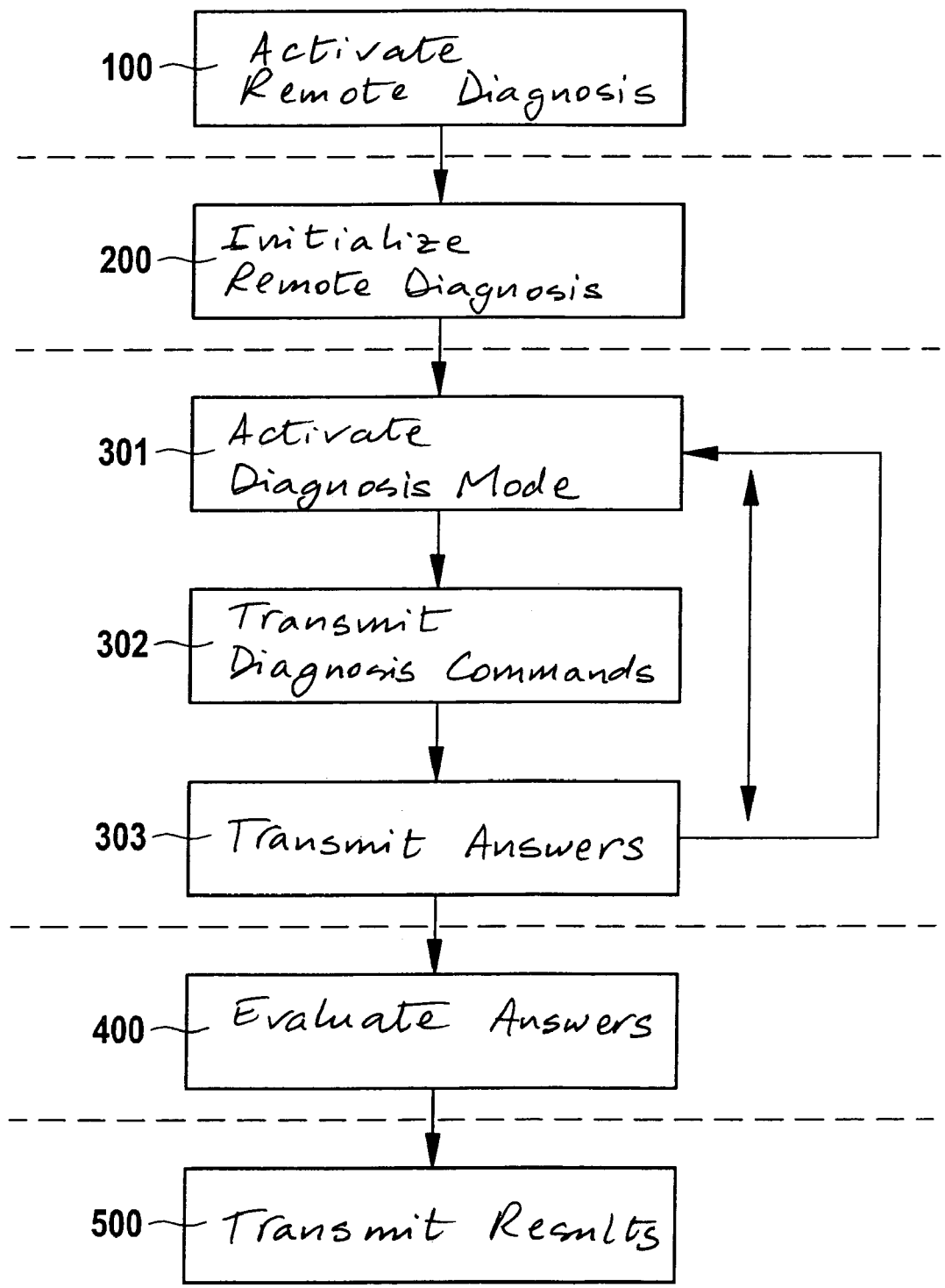
FIG. 3 shows a flow chart, which illustrates the basic sequence of remote diagnosis, in particular regarding the transmission between server and data terminal and with respect to the functions of the data terminal or the server in an exemplary embodiment.

FIG. 3 shows a flow chart of the overall method, which is subdivided into five basic partial steps. The detailed sequences within such a partial procedure may be varied depending on the vehicle type, the possibly present error case and/or the respective implementation of the system in the diagnosis server. The diagnosis is started in a first step 100 by a corresponding query to the server. In the exemplary embodiment, the activation is implemented by the driver or user of the motor vehicle who, via a call or similar approach to the service center, generates a request of the server to the client in the vehicle to establish a diagnosis connection. The client thereupon establishes the requested connection. In other exemplary embodiments the diagnosis connection is established in response to a query originating with the client. In this case, the actual diagnosis connection will be established by the server or the client. In the following step 200, the server configures the remote-diagnosis functionality in the vehicle. The sequence control, the transport layer and possibly the CAN communication are adapted to the specific vehicle. This is achieved by commands or data from the server, which the server reads out from a database for the specific vehicle or the specific vehicle type and/or the equipment variant. During activation, the server obtains information about the vehicle to be diagnosed, for example by means of an identification code. With the aid of this information, it reads out vehicle-specific parameters from the database, which it then transmits to the client for configuration of the remote diagnosis functionality.

Following the partial steps activation (100) and initialization (200), the partial step implementation of the diagnostic procedure (301 through 303) is illustrated using the example of a control unit. First of all, in step 301, the server activates the diagnosis mode in the control unit to be diagnosed, if required, so that the control unit is able to execute the diagnosis function. The control unit is identified as well, for example its software level, so that the diagnostic commands may be adapted to the specific control-unit type. This, too, is optional and is utilized when it seems warranted due to the multitude of software levels, for instance. The selected diagnosis commands are then transmitted from the server to the client in the vehicle.

Examples for such diagnosis commands are read-out of at least one fault memory of the control unit in question, read-out of stored environmental parameters of an occurring error and/or polling of additional instantaneous values from the individual control unit.

In step 302, the client implements the transmitted diagnosis command(s) onto the vehicle network. In the following step 303, the answer of the control unit to the transmitted command(s), which must occur within a specific time period, for instance, is received, implemented onto the server by the client via the transmission interface and returned thereto.

Steps 301 through 303 will then be repeated for each control unit to be diagnosed or, if the diagnostic commands are individually transmitted one after another or if they are successively transmitted in groups, will be repeated for each individual diagnostic command or diagnostic-command group. If the diagnosis of a control unit has ended, a termination command is sent as diagnosis command, which possibly deactivates the diagnosis mode in the control unit and resets it to normal operating mode.

The fourth partial step relates to the evaluation of the received data in the server (step 400). The server evaluates the collected error information in accordance with a possibly specific algorithm and determines a diagnosis result and/or recommendations concerning the further steps. In the following step 500, the results determined by the server are then transmitted to the data terminal, which displays them in the vehicle. This fifth partial step therefore constitutes the output of the result. In an exemplary embodiment, this step also includes the transmission and display of a recommendation concerning the further procedure in the event of a fault, such as "visit service facility", etc.

FIG. 4 shows an exemplary communication scenario between a remote-diagnosis server, a telematics data terminal and a control unit. The communication scenario illustrates a detailed realization of the third partial step in FIG. 3. Diagnosis protocol KWP2000 specified in accordance with ISO 14230-3 forms the basis of the communication. In other exemplary embodiments, manufacturer-specific variants of this diagnosis protocol or also other diagnosis protocols are utilized accordingly. Depending on the exemplary embodiment, the sequence of steps and the scope of the steps vary with the individual applications. FIG. 4 shows an exemplary embodiment of the communication between a remote-diagnosis server I, a telematics data terminal II located in the vehicle and a control unit III to be diagnosed. The communication is based on diagnosis protocol KWP2000 as it is specified in ISO 14230-3. In most cases the fault detection and the setting of the fault memories are implemented in the control unit to be diagnosed, using known diagnostic methods, via software which is installed there or is read in.

FIG. 4 shows the individual steps of a communication between the three participating units; a time sequence from top to bottom is meant to be expressed. Software programs which generate, evaluate, etc. the messages to be transmitted are available in the units.

After concluding partial processes 1 and 2 (cf. FIG. 3, steps 100 and 200), the diagnostic mode is activated in the control unit to be diagnosed in a first step S1. To this end, the server transmits a corresponding diagnosis command (start-diagnostic-session request). This command is received by the data terminal and relayed to the control unit to be diagnosed (step S2) via the interface, or it is first converted into a format suitable for the vehicle network (using a table, for example) and then forwarded to the vehicle network. The control unit to be diagnosed responds with a corresponding reply (start-diagnostic-session response), which indicates whether or not the diagnosis mode has been initiated. In step S3, the control unit to be diagnosed transmits this information to the data terminal, which in turn forwards the information to the server in step S4 (possibly after converting it into the provided format).

To control the sequence and to satisfy the timing requirement, a command (tester-present request) is thereupon sent in step S5 from data terminal II to control unit III in the vehicle network, to which the control device responds by a corresponding answer (tester-present response) in step S6. In the following, this communication will be carried out during the diagnostic procedure whenever no other diagnosis command is to be transmitted by the server, or whenever no response is to be forwarded to the server by the control unit. As a result, steps S5 and S6 may also be repeated several times until the server receives the expected command. If one of the mentioned events fails to occur, the communication between data terminal and control unit is terminated.

After receiving the response in step S4, the server sends a command (read ECU-identification request) in step S7, which asks for the identification of the control unit to be diagnosed. The data terminal receives this command and possibly implements it, and then transmits it to the control unit in step S8. The control unit thereupon reads out at least one identification parameter from its memory, transmitting it to the data terminal (read ECU-identification response, step S9). In step S10, this information, possibly having been implemented, is then transmitted by data terminal II to the server. With the aid of the identification parameters the server detects the control unit, its software level, if applicable, and possibly the vehicle as well and selects corresponding parameters from the database. In the meantime, as illustrated by steps S11 and S12, the afore-described tester-present communication is carried out between the data terminal and the control unit to be diagnosed, thereby ensuring that the communication between the data terminal and control unit is maintained, the control unit stays in diagnosis mode, and no violation of the marginal conditions for the communication in the vehicle network occurs, which leads to termination.

In the next steps the fault memories of the control unit to be diagnosed are read out. To this end, after receipt of the message in S10 and after reading out the parameters specific to the control unit to the data terminal in step S13, the server transmits a corresponding inquiry (read DTC-request). This inquiry includes the parameters specific to the control unit, which indicate, for example, which fault memories are to be read out. In step S14, this inquiry is transmitted from the data terminal to the control unit possibly after having been implemented. The control unit executes the received commands and, in step S15, sends the contents of the fault memories to the data terminal as read-DTC response message. The read-DTC response message thus includes the relevant contents of the fault memories. In step 16, the reply is transmitted from the data terminal to the server, possibly following implementation, whereupon, in steps S17 and S18, the afore-mentioned tester-present communication between the data terminal and control unit is carried until another message is received from the server.

In the following optional partial step, the ambient parameters associated with the fault entries are read out. For this purpose, following receipt of the message in step S16 and evaluation of the fault entries in step S19, the server sends a corresponding inquiry (read-freeze frame request) to the data terminal, which the data terminal forwards to the control unit in step S20, possibly after implementation. Depending on the variant, the control unit then reads out the desired parameters of the stored faults, or the server specifies the contents of its message on the basis of the contents of the fault memories, so that only certain ambient parameters are requested by this message. In any event, the control unit replies with a corresponding answer (read-freeze frame response), which includes the parameters requested in one way or the other. In step S21, the answer is sent to the data terminal, which in turn transmits the reply to the server in step S22, possibly after implementation. In steps S23 and S24, the tester-present communication takes place again.

In the following partial step, after the fault memories and associated ambient parameters have been read out and transmitted, the diagnosis mode is deactivated in the control unit. To this end, the server sends a request for termination of the diagnostic procedure (stop-diagnostic-session request) to the data terminal. The data terminal forwards the termination request to the control unit (step S26), which responds by a corresponding answer signal (stop-diagnostic session response) in step 27 by means of which the control unit reports termination of the diagnosis mode. In step S28, this information is transmitted from the data terminal to the server. Thereupon (step S29), the afore-described partial procedures 4 and 5 regarding evaluation and display of the diagnosis results and possibly the diagnosis recommendations are continued.

The illustrated communication scenario is an example. Other exemplary embodiments may lack the steps pertaining to the activation and deactivation of the diagnosis mode in the control unit and/or for identification of the control unit and/or for read-out of the associated ambient parameters.

The specific technical realization of the illustrated communication is implemented by appropriate software programs in the server, data terminal and control unit, each of which by itself is also part of the present invention.

What is claimed is:

1. A method for performing a telematics service on a vehicle, the method comprising:
    subdividing the telematics service into partial telematics functionalities that are critical with respect to time and partial telematics functionalities that are not critical with respect to time;
    establishing a communication connection between a server and a data terminal located in the vicinity of the vehicle;
    executing in the server the partial telematics functionalities that are not critical with respect to time; and
    executing in the data terminal the partial telematics functionalities that are critical with respect to time.

2. The method of claim 1, wherein the partial telematics functionalities that are critical with respect to time are executed in the data terminal in an autonomous manner, and the partial telematics functionalities that are not critical with respect to time are implemented by the server via communication with the data terminal.

3. The method of claim 2, wherein the partial telematics functionalities that are critical with respect to time comprise the communication with a control unit located in the vehicle, 4. The method of claim 3, wherein the telematics service includes a remote diagnosis of the vehicle, the remote diagnosis being implemented through a diagnosis protocol, and wherein the diagnosis protocol is implemented in the server.

5. The method of claim 4, wherein the diagnosis protocol is implemented by transmission of diagnosis commands from the server to the data terminal via an air interface.

6. The method of claim 5, wherein the data terminal implements the diagnosis commands by transmitting commands to the control unit via a vehicle network, receiving answers from the control unit via said vehicle network, and transmitting the answers to the server via the air interface.

7. The method of claim 6, wherein the diagnosis protocol includes KWP2000.

8. A method for performing a telematics service on a vehicle, the method comprising:
    subdividing the telematics service into partial telematics functionalities that are critical with respect to time and partial telematics functionalities that are not critical with respect to time;
    establishing a communication connection between a server and a data terminal located in the vicinity of the vehicle; and
    executing in the server the partial telematics functionalities tat are not critical with respect to time.

9. A method for performing a telematics service on a vehicle, the method comprising:
    subdividing the telematics service into partial telematics functionalities that are critical with respect to time and partial telematics functionalities that are not critical with respect to time;
    establishing a communication connection between a server and a data terminal located in the vicinity of the vehicle; and
    executing in the data terminal the partial telematics functionalities that are critical with respect to time.

10. A method for performing a remote diagnosis of a vehicle, the method comprising:
    activating the remote diagnosis by establishing a communication connection between a server and a data terminal located in the vicinity of the vehicle;
    initializing the remote diagnosis by transmitting vehicle information from the data terminal to the server;
    activating a diagnosis mode in a control unit located in the vehicle;
    transmitting diagnosis commands from the server to the control unit via the data terminal;
    transmitting answers resulting from execution of the diagnosis commands from the control unit to the server via the data terminal;
    evaluating the answers in the server; and
    transmitting results of the evaluation from the server to the data terminal.

* * * * *